(12) United States Patent
O'Meara

(10) Patent No.: US 6,385,058 B1
(45) Date of Patent: May 7, 2002

(54) ACTIVE BLEED VOLTAGE BALANCING CIRCUIT

(75) Inventor: Kevan O'Meara, Chatsworth, CA (US)

(73) Assignee: Northrop Grumman, Woodland Hills, CA (US)

( * ) Notice: Subject to any disclaimer, the term of this patent is extended or adjusted under 35 U.S.C. 154(b) by 0 days.

(21) Appl. No.: 09/859,627

(22) Filed: May 17, 2001

(51) Int. Cl.⁷ .......................... H02M 3/335; H02M 5/42
(52) U.S. Cl. ...................... 363/21.01; 363/89
(58) Field of Search .................... 363/21.01, 21.07, 363/21.09, 89, 127, 82, 91, 25

(56) References Cited

U.S. PATENT DOCUMENTS

| | | | |
|---|---|---|---|
| 3,986,097 A | * | 10/1976 | Woods ........................ 363/22 |
| 4,811,187 A | * | 3/1989 | Nakajima et al. ............. 363/25 |
| 4,870,555 A | * | 9/1989 | White ........................ 363/16 |
| 4,903,189 A | * | 2/1990 | Ngo et al. ................... 363/127 |
| 4,922,404 A | * | 5/1990 | Ludwing et al. ............. 363/89 |

* cited by examiner

*Primary Examiner*—Rajnikant B. Patel
(74) *Attorney, Agent, or Firm*—Price and Gess

(57) ABSTRACT

A power supply Active Bleed Voltage Balancing Circuit for attachment to the outputs of a regulated power supply having at least a first output and a second output to shunt load power from an output that has become unloaded and has an output voltage that is rising past an acceptable limit. The Active Bleed Voltage Balancing Circuit has an inductor with a first terminal coupled to the first power supply output. The second output voltage exceeds the first output voltage. An oscillator driven totem-pole driver alternately drives the inductors second terminal to the power supply second output and then to ground. The duty cycle ratio is adjusted to equalize the volt-seconds applied in each position. An alternative circuit uses a multiple winding inductor with a 50/50 duty cycle and with balancing achieved by adjusting the turns ratio to equal the ratio of the output voltages.

21 Claims, 5 Drawing Sheets

ACTIVE BLEED VOLTAGE BALANCING CIRCUIT

FIELD OF THE INVENTION

The present invention relates to multiple output switch-mode regulated power supplies and more particularly to the process of post regulating at least one power supply output voltage using a switchmode shunt load.

BACKGROUND OF THE INVENTION

Multiple output regulated switchmode supplies of all types have a common tendency to exhibit poor regulation on outputs that are not sensed. The regulation of these outputs is even poorer when such outputs experience substantially reduced or no-load conditions. Improved or even precise regulation is obtained on such outputs by use of a secondary regulator using a series or pass transistor and a dedicated control loop referenced to a precision reference. The use of a secondary regulator imposes the undesirable burdens of added cost, lower efficiency, size, parts count, weight, cooling requirements, reliability due to increased parts count.

Some multiple output switchmode power supplies sense multiple outputs to obtain improved cross regulation. As one output becomes lightly or heavily loaded its output increases or decreases thereby imposing a cross-regulation decrease or increase penalty on the output voltage of the output operating at constant load. Other multiple output supplies have a "primary" output voltage that is well regulated and secondary outputs that are "quasi" regulated, and which may require a minimum load to maintain regulation. The regulated performance of multiple sensed output supplies and "quasi" regulated supplies, or perhaps even existing "off-the-shelf" power supplies may be improved by coupling the invention circuit taught herein to the outputs of such supplies.

BRIEF SUMMARY OF THE INVENTION

An active power supply output bleed balancing circuit is presented that is connected between a first power supply output and a second power supply output while being referenced to a reference potential such as ground. The output bleed balancing circuit improves the regulation of the output voltages of a multiple output switchmode power supply over wide load ranges including a no-load or interrupted load event on one of the output voltages.

The invention circuit functions as an active bleed coupled between the first power supply output and the second power supply output voltages. The circuit is a bi-directional switching regulator programmed to clamp the first power supply output voltage to a value not to exceed the predetermined ration of the second power supply operate at a voltage ratio between input and output. It one output goes too high current is shunted from it to the second output, and vice versa.

The switching topology used for the invention depends on the voltage relationships between Vo1 and Vo2. In general, if Vo1 and Vo2 are both positive, then a buck or boost may be used. If one voltage is negative, a flyback or half wave regulating inverter could be used.

DETAILED DESCRIPTION OF THE INVENTION

Figure 1:
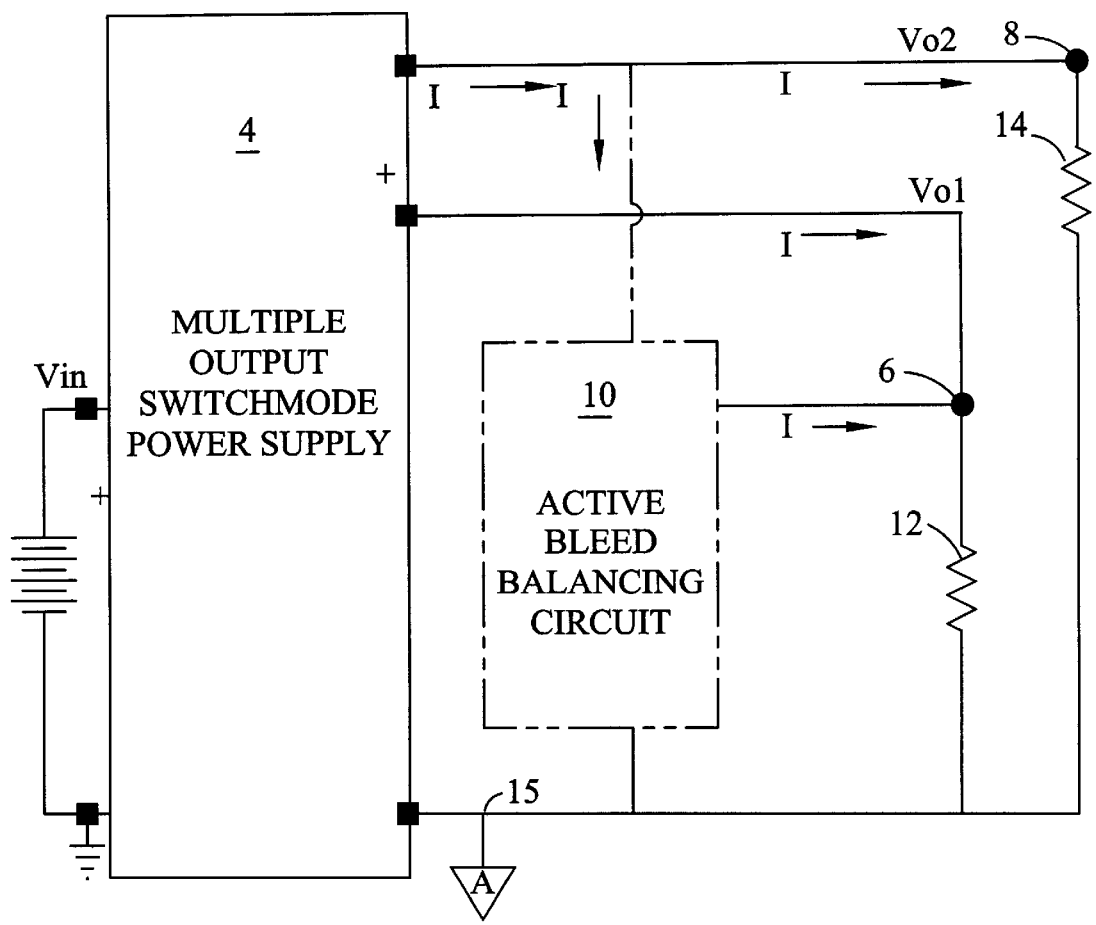
FIG. 1 is a schematic block diagram representing a power supply with a first and second positive output voltage and a second block representing the Active Bleed Voltage Balancing Circuit connected to the outputs of the power supply.

FIG. 1 is a schematic that shows a power supply represented by block 4 with first and second positive output voltages Vo1, Vo2 at respective first and second output voltage nodes or terminals 6, 8, and a second block representing an Active Bleed Voltage Balancing Circuit 10 connected to and used to provide post regulation of the power supply output voltages by shunt regulation in response to changes in the loads 12, 14 supported by the first and second output voltages Vo1 and Vo2. In each of the embodiments to be characterized, the output voltages of the power supply 8, are expected to have an acceptable range measured with respect to a reference potential when operated within the extremes of a rated load and input voltage range.

Figure 2:
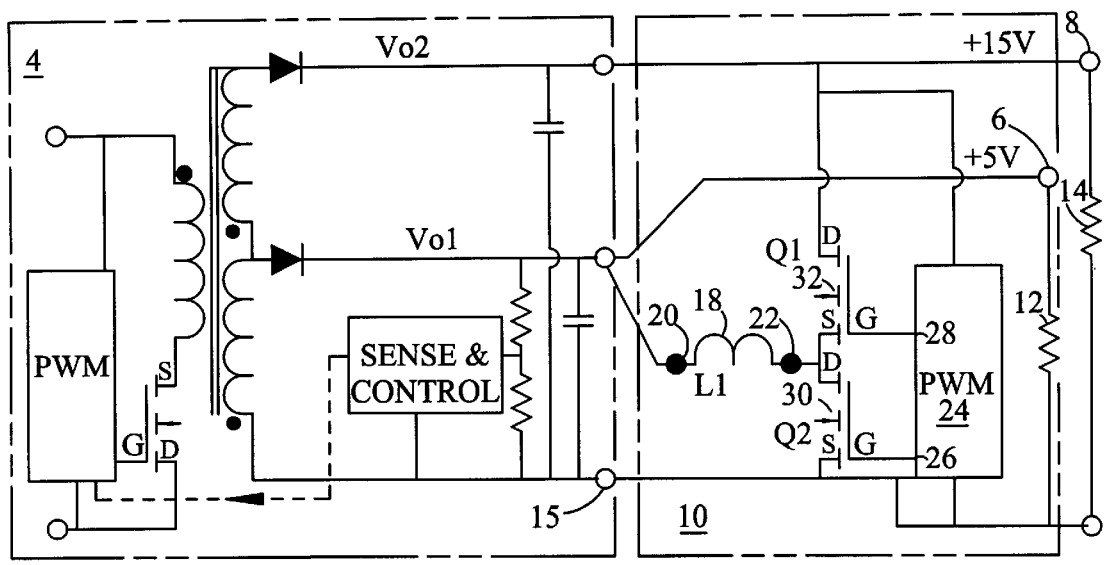
FIG. 2 is a schematic showing the modulator stage of a dual output flyback power supply having first and second positive outputs with a simplified schematic of the Active Bleed Voltage Balancing Circuit connected to the outputs of the power supply.
Figure 4:
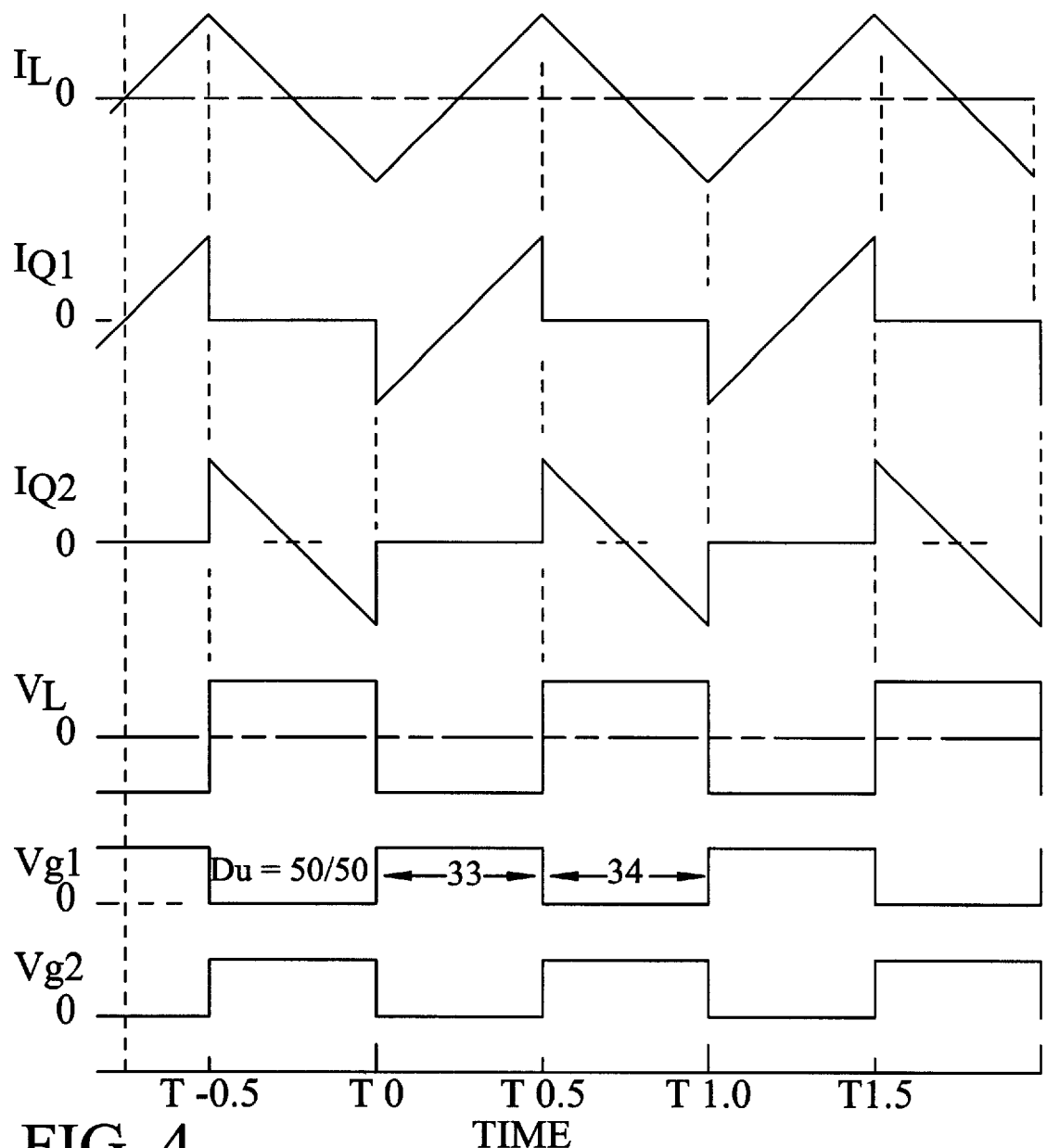
FIG. 4 is a graph of some of the current and voltage waveforms of FIGS. 2, 3 and 5.

FIG. 2 shows the Active Bleed Voltage Balancing Circuit 4 coupled to the output terminals 6, 8 and an inductor 18 with a first terminal 20 and a second terminal 22. The inductor's first terminal is connected to the first output node 6. An oscillator, (not shown) within the PWM (Pulse Width Modulator) block 24 provides a sequence of control signals, such as alternating gate drive signals from PWM outputs 26, 28 to the gates of N-Channel MOSFETs 30, 32. In an alternative embodiment, the PWM 24 can be a CMOS 555 Timer Circuit with its output terminal coupled to drive the first and second bi-directional switches 30, 32 coupled as a totem pole pair between the second output node 8 and the reference potential 15. The FETs 30, 32 therefore represent first and second bi-directional switches coupled as a totem pole pair between the second output node and the reference potential. The switches have an intermediate node coupled to the inductor second terminal 22. The first switch 30 is driven into conduction during a first time interval such as time interval 33 on FIG. 4 and the second switch 32 is driven into conduction during the second time interval. Field effect transistors such as FETs 30 and 32 conduct current in either direction when commanded into conduction. Bi-directional conduction is necessary for proper operation since under light load conditions, current flows through the switches in both directions for short periods of time. The IQ1 and IQ2 curves of FIG. 4 show current flowing in both positive and negative directions. Current through the inductor, IL is also shown reversing direction.

Referring to FIG. 4, the first switch 30 is driven into conduction during the first time interval 33 and the second switch is driven into conduction during the second time interval 34.

Some PWM controllers, such as those available from Unitrode, a division of Texas Instrument, for the design of power supplies, have first and second complementary outputs as depicted by the PWM 24 of FIG. 2. Such outputs provide a first control signal and a second control signal, with the second control signal being the complement of the first for push-pull drive applications.

FETs 30, 32 therefore form a semiconductor switching means with a first and second FET (field effect transistor) 30, 32. Each respective FET has a control gate G, and a conduction channel having a respective drain D and a source S. The drain of the first FET 32 is coupled to the second output node 8. The source of the first FET 32 labeled S and the drain of the second FET 30 labeled D are coupled to the inductor second terminal 22. The source of the second FET is connected to the reference potential 15. The gates are coupled to the complementary outputs of the PWM 24 and are therefore responsive to the first and second control signals, such as Vg1 and Vg2 in FIG. 4, for alternately switching the inductor second terminal 22 to the second output node 8 during the control signal first time interval 33. During the control signal second time interval 34, the control signal goes to a second state, or low, FET 32 turns off disconnecting the second terminal 22 from the second output node 8 and connecting the second terminal 22 to the reference potential or ground 15.

The use of a PWM controller, such as the Unitrode UC 3842 Current Mode PWM Controller provides a totem-pole driver output that might be used in the circuit arrangement of FIG. 2 by eliminating the Q1 and Q2 FETs and replacing their function with the internal totem-pole driver in the UC 3842. If the UC 3848 is used it provides complementary outputs which can drive the gates of Q1 and Q2. By sampling a portion of the second output voltage and comparing the sample with an internal precision reference, an error signal is developed and amplified. The error signal is used by the controller to adjust the duty cycle so as to drive the error signal to zero by adjusting the control signal first or second time interval duration to maintain the second output voltage within a predetermined range. The control circuit or PWM 24 is further characterized in a first alternative embodiment to reduce the first time interval 33 while holding the period constant in response to larger values of the error signal of a first polarity. The PWM operates to shorten the first time interval 33 while holding the duty cycle constant in response to increasing values of an error signal of a second polarity.

FIG. 4 provides voltage and current waveforms as a function of time. The waveforms Vg1 and Vg2 show the form of the gate drive signals out of a conventional PWM controller 24 that typically have a first state, such as a high of +5 V during a first time interval 33 and a low of 0.0 V during a second time interval. The wave form for Vg1 is shown assuming a first state or high during the time interval from T0 to T0.5 and a low during a second time interval 34 such as from T0.5 to T1.0. In operation, N-Channel MOSFETs such as Q1 and Q2 represent a "semiconductor switching means" responsive to the control signals, i.e., to the gate drive signals Vg1 and Vg2.

The gate drive signals have amplitudes that are sufficiently positive with respect to the sources of the FETs to alternately switch the FETs into an on or highly conductive state. During a control signal first time interval 33, such as the time interval from T0 to T0.5, FET 32 switches the inductor second terminal 22 to the second output, node 8, at voltage Vo2. The voltage across the inductor is depicted as wave form VL and the current in the inductor as waveform IL. The current is shown as having a positive slope during the first time interval 33. The current in the inductor at time T0 is initially shown as having a negative value and as leaving the inductor from node 22, passing through FET 32 and flowing into node 8. The amplitude of the current passes through zero at the mid point between T0 and T0.5 and then begins a positive rise with a positive slope reaching a peak at time T0.5. During the positive rise, current is leaving node 8 and entering the inductor terminal 22.

During the same interval, T0 to T0.5, the Vg2 gate drive signal to the gate of FET 30 is low or zero volts with respect to the source of FET 30 holding FET in a non-conductive state. The gate drive signal to the gate of FET 30 is in its second state when low. The gate drive signal to the gate of FET 32, Vg1, assumes a second state turning FET 32 off during the second time interval 34 from T0.5 to T1.0. The gate drive signal to the gate of FET 30 rises to a first state from zero to five volts driving the conduction channel of FET 30 into a highly conductive state connecting the inductor second terminal 22 to the reference potential 15 or ground 15 for a control signal second time interval.

The circuit within phantom block 4 of FIG. 2 schematically represents the modulator section of a conventional flyback regulator having a first and second positive outputs having different voltages. The Active Bleed Voltage Balancing Circuit 10 is shown connected to the first and second positive outputs of the power supply. It should be understood that, it is believed that, the invention Active Bleed Voltage Balancing Circuit 10 can be used with any conventional regulated or unregulated power supply topology.

Figure 3:
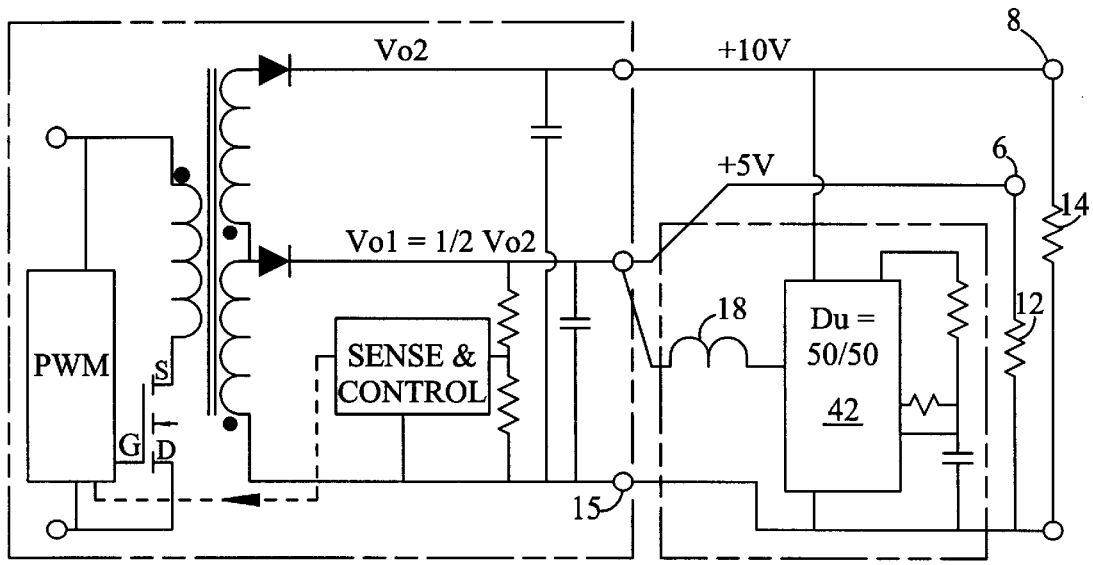
FIG. 3 is a schematic showing the modulator stage of a dual output flyback power supply having first and second positive outputs with a 2:1 ratio and with a simplified schematic of the Active Bleed Voltage Balancing Circuit using a controller with a 50% Du timer connected to the outputs of the power supply.

FIG. 3 provides an alternative embodiment for the Active Bleed Voltage Balancing Circuit 10 in which the PWM is replaced by a CMOS 555 timer 42. The frequency of the timer would have to be adjusted to control the peak to peak current swing in the inductor 18 as a function of the self inductance of the inductor and the voltage differences across the inductor. The pulse width of the output of the 555 timer is adjusted to adjust the duty cycle ratio of the totem-pole transistor pair in the output of the timer 42 to match the volt second average of the voltage across the inductor to ground to equal the volt second average of the voltage across the inductor when coupled between the two output nodes 8, 6.

The embodiments of FIGS. 2 and 3 are used where the output voltages are different and in which the duration of the first time interval is adjusted to prevent the first or second output voltage from exceeding the acceptable range measured with respect to the reference potential 15. As an output voltage of the power supply is unloaded, its magnitude will typically rise. The Active Bleed Voltage Balancing Circuit operates to impose a shunt load on a rising output that increases with the rising voltage thereby restricting the rise in voltage to a band within the allowable regulation band while using the shunt current to support other output loads.

In operation, the first time interval 33 divided by the sum of the first and second time intervals 33, 34 form a duty cycle ratio, Du. The duty cycle ratio Du is adjusted in the embodiment of FIG. 2 to control the second output voltage Vo2 at node 8 to remain within its permitted range while the external load on node 8 is reduced to near zero. The ratio of the first time interval to the sum of the first and second time interval is adjusted to substantially equal the ratio of the first output voltage Vo1 to the second output voltage Vo2.

The possibility of operating the invention without a feedback loop controlling the duty cycle provides reduced complexity and parts cost. However it is difficult to fix a duty cycle time and frequency with precision and stability such as with a CMOS 555 timer. The circuits of FIGS. 5, 6, 7 and 8 operate with a precise 50/50 duty cycle which is stable and easily maintained by operating an oscillator at twice the switching frequency and dividing the oscillator frequency by two using a flip-flop and the necessary logic to obtain precise complementary wave forms that can be buffered to form precise complementary gate drive signals of equal duration. Variations in the oscillator frequency do not change the duty cycle ratio.

Figure 5:
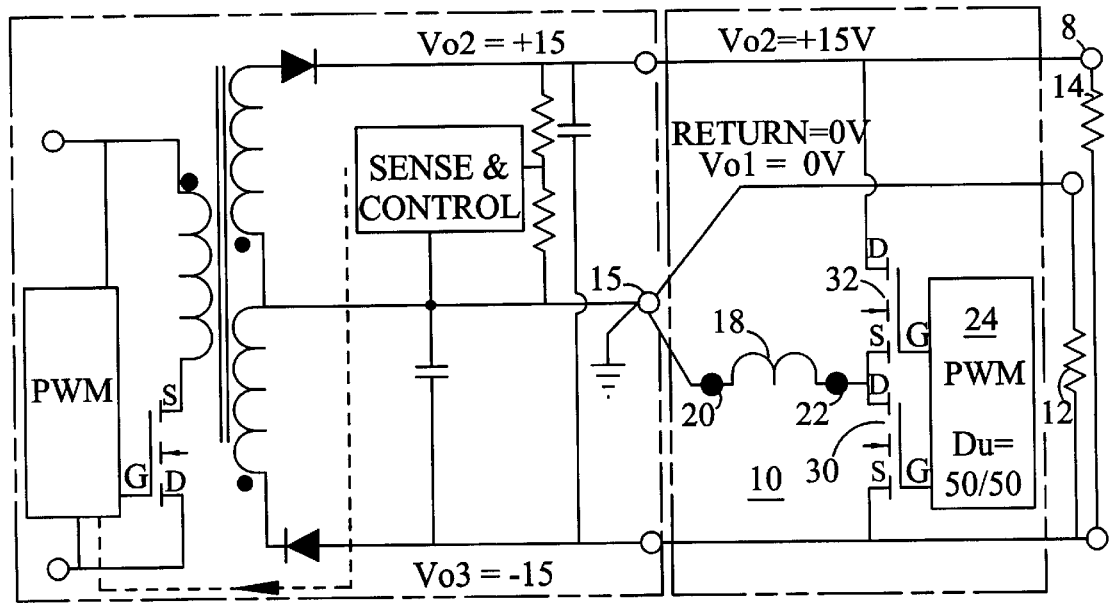
FIG. 5 is a schematic showing the modulator stage of a dual output flyback power supply having balanced positive and negative voltage outputs with a simplified schematic of the Active Bleed Voltage Balancing Circuit using a 50/50 duty cycle connected to the outputs of the power supply.

FIG. 5 shows a power supply with equal but opposite polarity outputs of plus and minus 15V. The PWM 24 in the Active Bleed Voltage Balancing Circuit 10 uses an internal oscillator with a clock frequency programmed with external R and or C components (not shown) and an internal divide by two circuit. A single inductor 18 is used in the same topology used for FIG. 2. The duration of the control signal first state, such as Vg1 during first interval 33, is substantially equal to the duration of the control signal second state such as Vg1 during interval 34. A feed-back loop to control the duty cycle is not shown because the duty cycle ratio is set to 50/50. The circuit of FIG. 5 is only applicable where the output voltages are equal and of opposite polarities.

Figure 6:
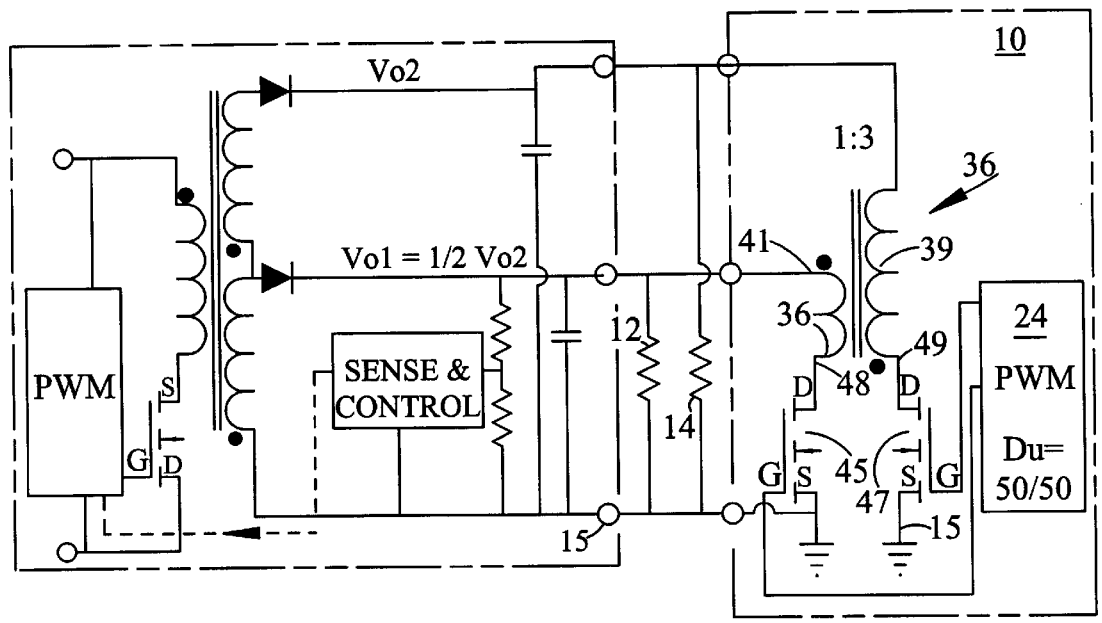
FIG. 6 is a schematic showing the modulator stage of a dual output flyback power supply having dissimilar positive voltage outputs and with the Active Bleed Voltage Balancing Circuit connected to the outputs of the power supply, using a transformer and a 50/50 duty cycle.
Figure 7:
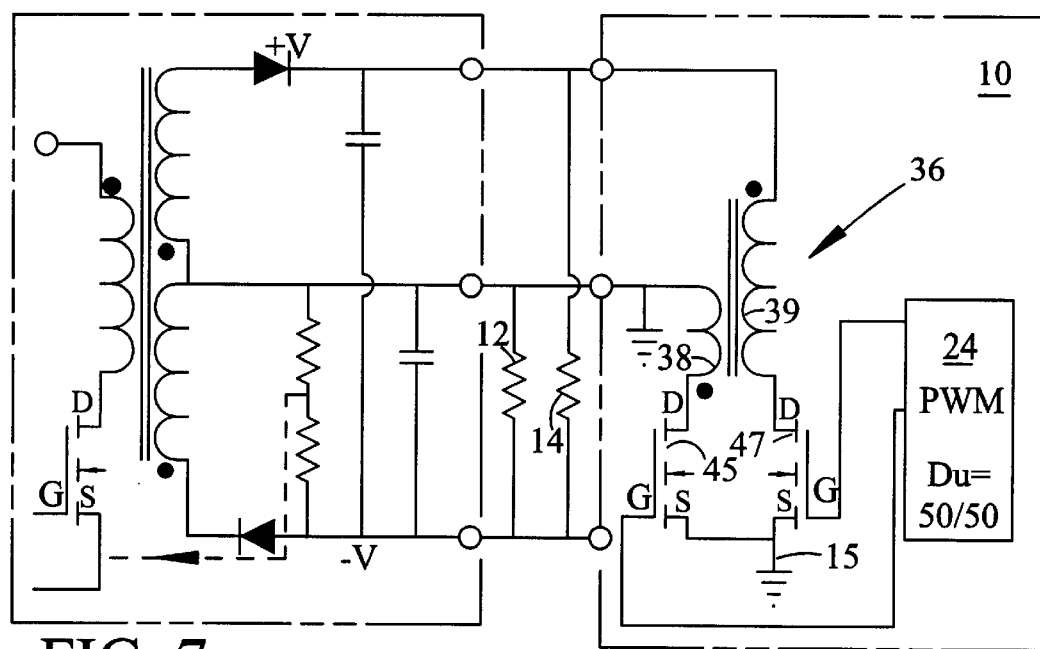
FIG. 7 is a schematic showing the modulator stage of a dual output flyback power supply having an un-balanced positive and negative voltage outputs with a simplified schematic of the Active Bleed Voltage Balancing Circuit connected to the outputs of the power supply, using a transformer and a 50/50 duty cycle.
Figure 8:
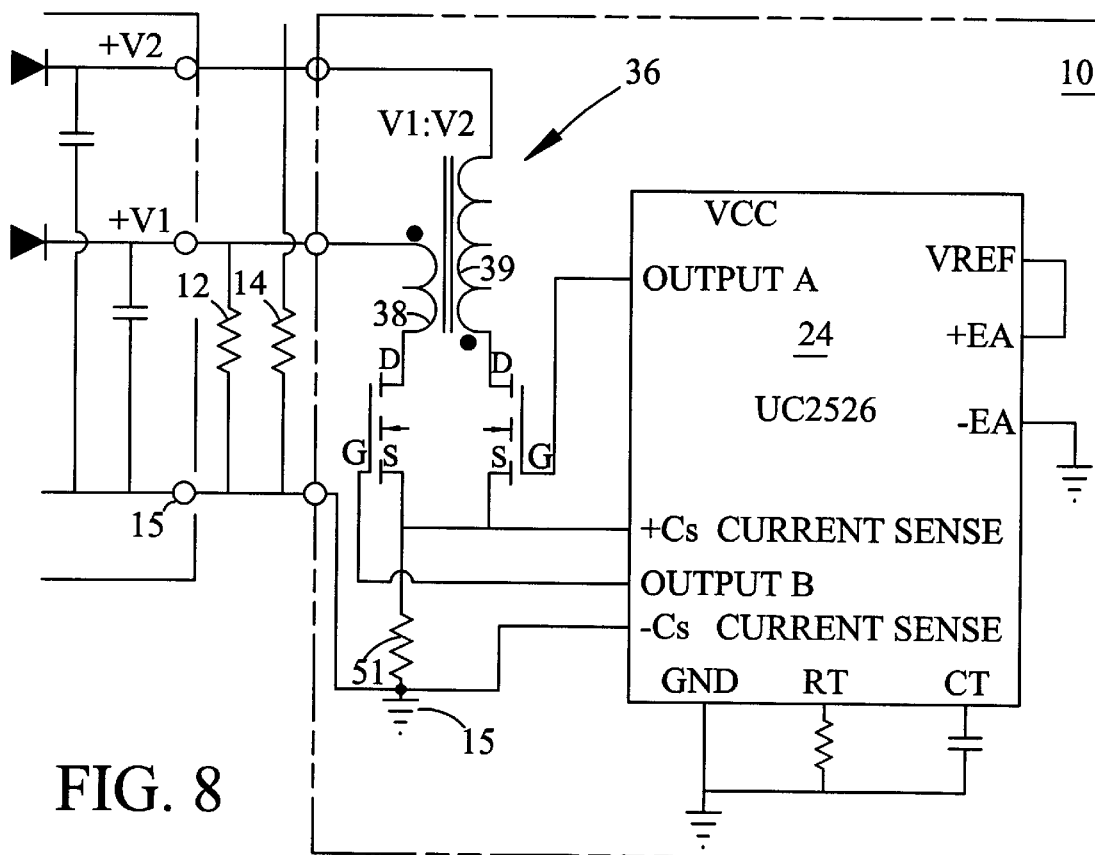
FIG. 8 is a schematic showing the modulator stage of a dual output flyback power supply having an un-balanced positive voltage outputs with a simplified schematic of the Active Bleed Voltage Balancing Circuit, connected to the outputs of the power supply using a transformer, a 50/50 duty cycle and a UC2526 controller with a current sensing input to limit bleed current.

FIGS. 6, 7 and 8 show topologies that make it possible to eliminate the need for a bleed resistor on either of the output voltages and to use a precise 50/50 duty cycle by substituting a multiple winding inductor or transformer for the single inductor 18 of FIGS. 2 and 5.

In the circuit of FIG. 6, the inductor 36 is a multiple winding inductor and has at least a first and second winding 38, 39. Each winding has a first and second terminal and a respective number of turns on a core. The inductor's first winding first terminal 41 is connected to the first output texnode 6. The inductor's second winding first terminal 43 is connected to the second output node 8. The duration of the control signal first state 33 is substantially equal to the duration of the control signal second state 34.

In the circuit of FIG. 6, the oscillator resides within a PWM (Pulse Width Modulator) control circuit, such as that described above in connection with a UC 3848 as an example of a controller that can provide a first control signal and a second control signal. The control signals being gate drive signals such as Vg1 and Vg2. The second control signal is the complement of the first, as can be seen with reference to FIG. 4.

FIG. 6 shows that the semiconductor switching means, such as FETs 45, 47 are responsive to the first and second control signals to their respective gates for switching the inductor first winding second terminal 48 to the reference potential 15 during each first time interval 33 and during each second time interval 34 for disconnecting the inductor first winding second terminal 48 from the reference potential and switching the inductor second winding second terminal 49 to the reference potential.

The outputs 6, 8 are balanced by setting the turns count on the first and second winding 38, 39 so that the volts/turn are equal for each of the windings when the output voltages are at the proper regulated levels and with the polarities as shown. In the example of FIG. 6, the second output voltage Vo2 is greater in magnitude (+15) than the first output voltage Vo1(+5V). The ratio of the turns on the second winding 39 to the turns on the first winding 38 is proportional to the ratio of the second output voltage Vo2 to the first output voltage Vo1. In the example of FIG. 6, with Vo1=+5V and Vo2=+15V, the turns count of the second winding 39 would be three times the winding count of first winding 38. If either output voltage goes too high, current is shunted from it to the second output, and vice versa.

FIG. 7 shows the circuit of FIG. 6 with the multiple winding inductor phased to permit the Active Bleed Voltage Balancing Circuit to be used with positive and negative output voltage levels. FIG. 8 shows the Active Bleed Voltage Balancing Circuit using a multiple winding inductor 36. A PWM using a UC2526 is shown with current sensing. The reference ground for the PWM is not isolated from the ground 15. The UC2526 is a Regulating Pulse Width Modulator that provides complementary outputs for the gates of the first and second FETs 45, 47. As shown, the amplifier has the +EA input wired to Vref and the −EA input wired to ground 15. This configuration maximizes the error driving the internal logic to provide a 50/50 drive at the Output A and Output B ports. Balancing of the multiple winding inductor currents is achieved by balancing the turns ratio in relation to the two output voltages as discussed above.

Resistor 51 monitors current leaving and entering the multiple winding inductors. The resistor is sized to drop approximately 100 mV at the maximum current limit, which sensed voltage shuts down the internal circuitry. Some adjustment in value may be required depending on devices used and limits required.

The circuit of FIG. 6 therefore shows a current limiting circuit coupled to sense the instantaneous current flowing in the inductor IL. The UC2526 interrupts switching in response to the instantaneous current through sense resistor 51 exceeding a predetermined threshold, such as 100 mV.

Unless a current limit is set, the maximum power transfer between the two outputs and the load regulation improvement is set by the effective DC impedance of the switching regulator. Maximum power transfer is traded off against efficiency. As the effective impedance is increased, less maximum power is transferred, but the improvement in regulation is diminished.

Assuming a totally lossless Active Bleed Voltage Balancing Circuit with zero impedances from the use of near ideal switches for example, the current through the circuit could rise to a very high levels but there would be very little power lost. However, in an actual circuit, there are finite impedances—both due to the power supply output(s) impedance and the impedance of the Active Bleed Voltage Balancing Circuit from channel resistance and copper and hysteresis losses in the inductor.

However, losses due to the balancing circuit can be expected to be very low. With a high impedance and low loss) the circuit will balance the output voltages with minimum loss also subject to the mismatch in output voltages being very small.

Low losses in the Active Bleed Voltage Balancing Circuit implies that there are low impedance in the balancing circuit. Low impedance in the Active Bleed Voltage Balancing Circuit is achieved with the use of FETs with low Ron (On Resistance) and heavy wire in the inductor. Therefore a design tradeoff study should be made for each application to determine where the benefit will be greatest.

As an alternative to an impedance which consumes power, an impedance could be added which would not substantially add to the losses. Sensing the current and automatically adjusting the duty cycle Du is one way of achieving this alternative.

ALTERNATIVE METHODS FOR IMPEDANCE CONTROL

1.) Adjust the duty cycle minutely as a soft function of the current. Changing the duty cycle from 50/50 to 49/51 or 51/49 should effect the magnitude of the current flowing through the switches. In the extreme, it should be possible to reverse the direction of the current flow.

2.) Change from a 50/50 duty cycle to a lesser but balanced duty cycle such as 25/25 or 10/10 duty cycle.

3.) Use a PIC microprocessor and program it to control the two switches in an intelligent protocol by sensing both voltage and current to optimally control the switching transistors. Limits are programmed to limit "balancing" as output currents rise or as voltages move into acceptable ranges. A PIC is a relatively low cost component so this is not a unreasonable solution, even if beyond the scope of the original circuit concept in that totally open loop operation was believed to be the most practical use and application.

IN CONCLUSION

1. A many power supplies sold commercially today use bleed resistors on the output to improve the load regulation. The bleed resistors also serve to discharge the output during a power off cycle, and to provide for regulation under no-load conditions.

2. Bleed resistors are inefficient.

3. An Active Bleed Voltage Balancing Circuit can replace bleed resistors providing an increase in efficiency and performance.

4. The active balancing circuit may be controlled in a number of ways, from simple to complex, depending on the how depending the application is. By way of example, for a 1KW power supply with a 100 watt bleed a complex control scheme could be justified. A 20W power supply with a 1 watt bleed would call for a simpler circuit approach.

5. Additional functions could be programmed into the active balance circuit as required. For example, the circuit could be controlled to quickly discharge the output capacitors after the system is turned off.

While particular embodiments of the present invention have been disclosed, it is to be understood that various different modifications are possible and are contemplated and believed to be within the true spirit and scope of the appended claims. There is no intention, therefore to limit the claims based on the disclosure herein presented.

What is claimed is:

1. A power supply Active Bleed Voltage Balancing Circuit comprising:

a power supply having at least a first output providing a first output voltage at a first output node and a second output providing a second output voltage at a second output node, each output voltage having a respective acceptable range measured with respect to a reference potential, an inductor having a first and second terminal, the inductor first terminal being coupled to the first output node, an oscillator for providing a sequence of control signals having a substantially fixed period, each control signal having a first state during a first time interval followed by a second state during a second time interval, semiconductor switching means responsive to the control signals for alternately switching the inductor second terminal to the second output node during the control signal first time interval and for disconnecting the second terminal from the second output node and connecting the second terminal to the reference potential for the control signal second time interval.

2. The power supply Active Bleed Voltage Balancing Circuit of claim 1 wherein the second output voltage is greater in magnitude than the first and wherein the duration of the first time interval is adjusted to prevent the first or second output voltage from exceeding the acceptable range measured with respect to the reference potential.

3. The power supply Active Bleed Voltage Balancing Circuit of claim 2 wherein the first time interval divided by the sum of the first and second time intervals forms a duty cycle ratio, the duty cycle ratio being adjusted to control the second output voltage to be within its acceptable range.

4. The power supply Active Bleed Voltage Balancing Circuit of claim 2 wherein: the ratio of the first time interval to the sum of the first and second time interval is adjusted to substantially equal the ratio of the first output voltage to the second output voltage.

5. The power supply Active Bleed Voltage Balancing Circuit of claim 1 wherein the power supply first output voltage has a nominal value and an acceptable range over a rated load, and the power supply second output voltage has a nominal value and an acceptable range over a rated load, and wherein the first output voltage nominal value is substantially equal to the second output voltage nominal value, the first and second output voltages having opposite polarities, and wherein the duration of the control signal first state is substantially equal to the duration of the control signal second state.

6. The power supply Active Bleed Voltage Balancing Circuit of claim 1 wherein the oscillator for providing a sequence of control signals further comprises a CMOS 555 Timer circuit having an output terminal coupled to drive a first and second bi-directional switch coupled as a totem pole pair between the second output node and the reference potential, the switches having an intermediate node coupled to the inductor second terminal, the first switch being driven into conduction during the first time interval and the second switch being driven into conduction during the second time interval.

7. The power supply Active Bleed Voltage Balancing Circuit of claim 1 wherein:

the oscillator further comprises a PWM (Pulse Width Modulator) control circuit for providing a first control signal and a second control signal, the second control signal being the complement of the first, the semiconductor switching means being responsive to the first and second control signals for alternately switching the inductor second terminal to the second output node during the control signal first time interval and for disconnecting the second terminal from the second output node and connecting the second terminal to the reference potential for the control signal second time interval, the PWM adjusting the control signal second time interval duration to maintain the second output voltage within a predetermined range.

8. The power supply Active Bleed Voltage Balancing Circuit of claim 1 wherein the semiconductor switching means further comprises:
   a first and second FET (field effect transistor), each respective FET having a control gate, and a conduction channel having a respective drain and a source, and wherein,
   the drain of the first FET is coupled to the second output node reference potential, the source of the first FET and the drain of the second FET are coupled to the inductor second terminal, and wherein the source of the second FET is connected to the reference potential, and wherein,
   the oscillator control signals being further characterized to be a first and second control signal, the second control signal being the complement of the first control signal, the first and second control signals being coupled to the gates of the respective first and second FETs.

9. The power supply Active Bleed Voltage Balancing Circuit of claim 1 wherein:
   the inductor has at least a first and second winding, each winding having a first and second terminal and a respective number of turns on a core,
   the inductor first winding first terminal being connected to the first output node, the inductor second winding first terminal being connected to the second output node,
   the duration of the control signal first state being substantially equal to the duration of the control signal second state,
   the oscillator further comprising a PWM (Pulse Width Modulator) control circuit for providing a first control signal and a second control signal, the second control signal being the complement of the first,
   the semiconductor switching means being further characterized to be responsive to the first and second control signals for switching the inductor first winding second terminal to the reference potential during each first time interval and during each second time interval for disconnecting the inductor first winding second terminal from the reference potential and switching the inductor second winding second terminal to the reference potential.

10. The power supply Active Bleed Voltage Balancing Circuit of claim 9 wherein:
    the second output voltage is greater in magnitude than the first output voltage, and
    the ratio of the turns on the second winding to the turns on the first winding is proportional to the ratio of the second output voltage to the first output voltage.

11. The power supply Active Bleed Voltage Balancing Circuit of claim 9 where in the PWM is further characterized to sample a portion of the second output voltage and to compare the sample portion with a precision reference voltage to form an error signal,
    the control circuit being further characterized to reduce the first time interval while holding the period constant in response to larger values of the error signal of a first polarity and operating to shorten the first time interval while holding the duty cycle constant in response to increasing values of an error signal of a second polarity.

12. A power supply Active Bleed Voltage Balancing Circuit for operation with a regulated power supply having at least a first output providing a first output voltage at a first output node and a second output providing a second output voltage at a second output node, each output voltage having a respective acceptable range measured with respect to a reference potential over a predetermined load range, the power supply Active Bleed Voltage Balancing Circuit comprising:
    an inductor having a first and second terminal, the inductor first terminal being coupled to the first output node, and
    a PWM controller circuit with a totem-pole output circuit using bi-directional switches, a power return terminal connected to a reference potential and an output terminal coupled to switch the inductor second terminal from the reference potential to the second output node and back to the reference potential with a duty ratio characterized to keep the first and second voltages within their respective acceptable ranges.

13. The power supply Active Bleed Voltage Balancing Circuit of claim 12 wherein the power supply first output voltage and the second output voltage are substantially equal in magnitude and have opposite polarities,
    and wherein the duty ratio is substantially 50/50.

14. The power supply Active Bleed Voltage Balancing Circuit of claim 12 wherein the first output voltage has a magnitude that is greater than the second output voltage and wherein, the PWM controller has a power input terminal coupled to the second output node.

15. The power supply Active Bleed Voltage Balancing Circuit of claim 12 wherein the PWM controller further comprises:
    current sense circuit for monitoring the amplitude of current passing through the inductor and for interrupting switching in response to the inductor current exceeding a predetermined limit.

16. The power supply Active Bleed Voltage Balancing Circuit of claim 12 wherein:
    the inductor has at least a first and second winding, each winding having a first and second terminal and a respective number of turns on a core,
    the inductor first winding first terminal being connected to the first output node, the inductor second winding first terminal being connected to the second output node,
    the PWM controller providing a first and second control signal, each respective control signal having a first state for a first time interval and a second state for a second time interval, the first and second control signals being complementary and the control signal first state being substantially equal to the duration of the control signal second state,
    the semiconductor switching means being further characterized to be responsive to the first and second control signals for switching the inductor first winding second terminal to the reference potential during each first time interval and during each second time interval switching the inductor second winding second terminal to the reference potential.

17. The power supply Active Bleed Voltage Balancing Circuit of claim 16 wherein:
    the inductor first winding has a first turns count and the inductor second winding has a second turns count and wherein the ratio of the first turns count to the second turns count is substantially equal to the ratio of the first voltage to the second voltage.

18. The power supply Active Bleed Voltage Balancing Circuit of claim 12 further comprising:

a first and second FET (field effect transistor), each respective FET having a control gate, and a conduction channel having a respective drain and a source, and wherein, the drain of the first FET being coupled to the second output node reference potential, the source of the first FET and the drain of the second FET are coupled to the inductor second terminal, and wherein the source of the first FET is connected to the reference potential, the PWM being further characterized to have first and second complementary outputs, the first and second complementary outputs of the PWM being coupled to drive the respective gate s of the first and second FETs with a duty ratio adjusted to hold the first output voltage and the second output voltage within their respective acceptable ranges.

19. The power supply Active Bleed Voltage Balancing Circuit of claim 18 wherein the PWM controller further comprises a current limiting circuit coupled to sense the instantaneous current flowing in the inductor and to interrupt switching in response to the instantaneous current exceeding a predetermined threshold.

20. A power supply Active Bleed Voltage Balancing Circuit for operation with a regulated power supply having at least a first output providing a first output voltage at a first output node and a second output providing a second output voltage at a second output node, each output voltage having a respective acceptable range measured with respect to a reference potential, each respective output voltage being coupled to a respective load, each respective load having a respective load range, the first output voltage range having a magnitude less than the second output voltage range, the power supply Active Bleed Voltage Balancing Circuit comprising:

a multiple winding inductor having at least a first and second winding, each respective winding having a first terminal and a second terminal, the first and second winding first terminals being respectively coupled to the first and second output nodes, a first and second FET (field effect transistor), each respective FET having a control gate terminal, and a conduction channel having a respective drain and a source terminal, the sources of the first and second FET conduction channel being coupled to the reference potential, the first and second drains being respectively coupled to the first and second winding second terminals, a control signal means for providing a continuous sequence of control signals, each control signal having a first state during a first time interval followed by a second state during a second time interval, the control signal first state being coupled to the first FET gate, a complement of the control signal being coupled to the second FET gate, the conduction channel of each respective field effect transistor being driven into a conductive state in response to the control signal being in a first state and into a non-conductive state in response to the control signal being in a second state, the ratio of the first time interval to the sum of the first and second time intervals being adjusted to substantially equal the ratio of the first output voltage to the second output voltage.

21. The power supply Active Bleed Voltage Balancing Circuit of claim 20 wherein the first time interval is substantially equal to the second time interval and wherein the inductor first winding has a first turns count and the inductor second winding has a second turns count and wherein the ratio of the first turns count to the second turns count is substantially equal to the ratio of the first voltage to the second voltage.

* * * * *